(12) United States Patent
Sosna et al.

(10) Patent No.: US 12,645,699 B1
(45) Date of Patent: Jun. 2, 2026

(54) SYSTEMS AND METHODS FOR NON-BLOCKING SYNCHRONIZATION OF SECURE CUSTOMER DATA

(71) Applicant: Veeva Systems Inc., Pleasanton, CA (US)

(72) Inventors: Arno Sosna, Pleasanton, CA (US); Jay H. Hartley, San Ramon, CA (US); Cindy Chiang, Sunnyvale, CA (US); Charlie Christopher Shaeffer, Roseville, CA (US); Samuel Kwong-Ming Leung, San Ramon, CA (US); Alex Weitsun Huang, San Ramon, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/048,452

(22) Filed: Feb. 7, 2025

Related U.S. Application Data

(63) Continuation of application No. 18/532,518, filed on Dec. 7, 2023, now Pat. No. 12,254,026.

(51) Int. Cl.
G06F 16/00 (2019.01)
G06F 16/27 (2019.01)

(52) U.S. Cl.
CPC .................................... *G06F 16/27* (2019.01)

(58) Field of Classification Search
CPC ....................................................... G06F 16/27
See application file for complete search history.

(56) References Cited

U.S. PATENT DOCUMENTS

2016/0034550 A1* 2/2016 Ostler ................... G06F 16/275
707/722
2020/0301947 A1 9/2020 Botev et al.

* cited by examiner

*Primary Examiner* — Ajith Jacob

(57) ABSTRACT

Systems and methods for non-blocking synchronization of secure customer data of an enterprise data storage. A first local data storage is established that can be used offline that includes a subset of secure customer data from the enterprise data storage. A second local data storage is established that includes the subset of secure customer data from the enterprise data storage. A data object record in the second local data storage is modified, and creates an associated entry in a tracking table, wherein entries in the tracking table maintain data object record modifications in the second local data storage. The first local data storage is cloned to create a third local data storage. Each entry in the tracking table is executed to modify the third local data storage. The first local data storage is deleted and the modified third local data storage replaces the deleted first local data storage.

20 Claims, 11 Drawing Sheets

<u>100</u>

AUDIT TRAIL STORAGE
150

CONTROLLED
CONTENT
REPOSITORY
102

MULTICHANNEL PROCESSING ENGINE
110

CUSTOMER RELATIONSHIP
MANAGEMENT (CRM)
108

CUSTOMER
RELATIONSHIP
MANAGEMENT
SERVER
106

CRM
SUBSYSTEM
104

NETWORK
150

USER DEVICE 120a

CLIENT
APPLICATION 121

CLIENT DATABASE
122

SYNCHRONIZATION
CONTROLLER
123

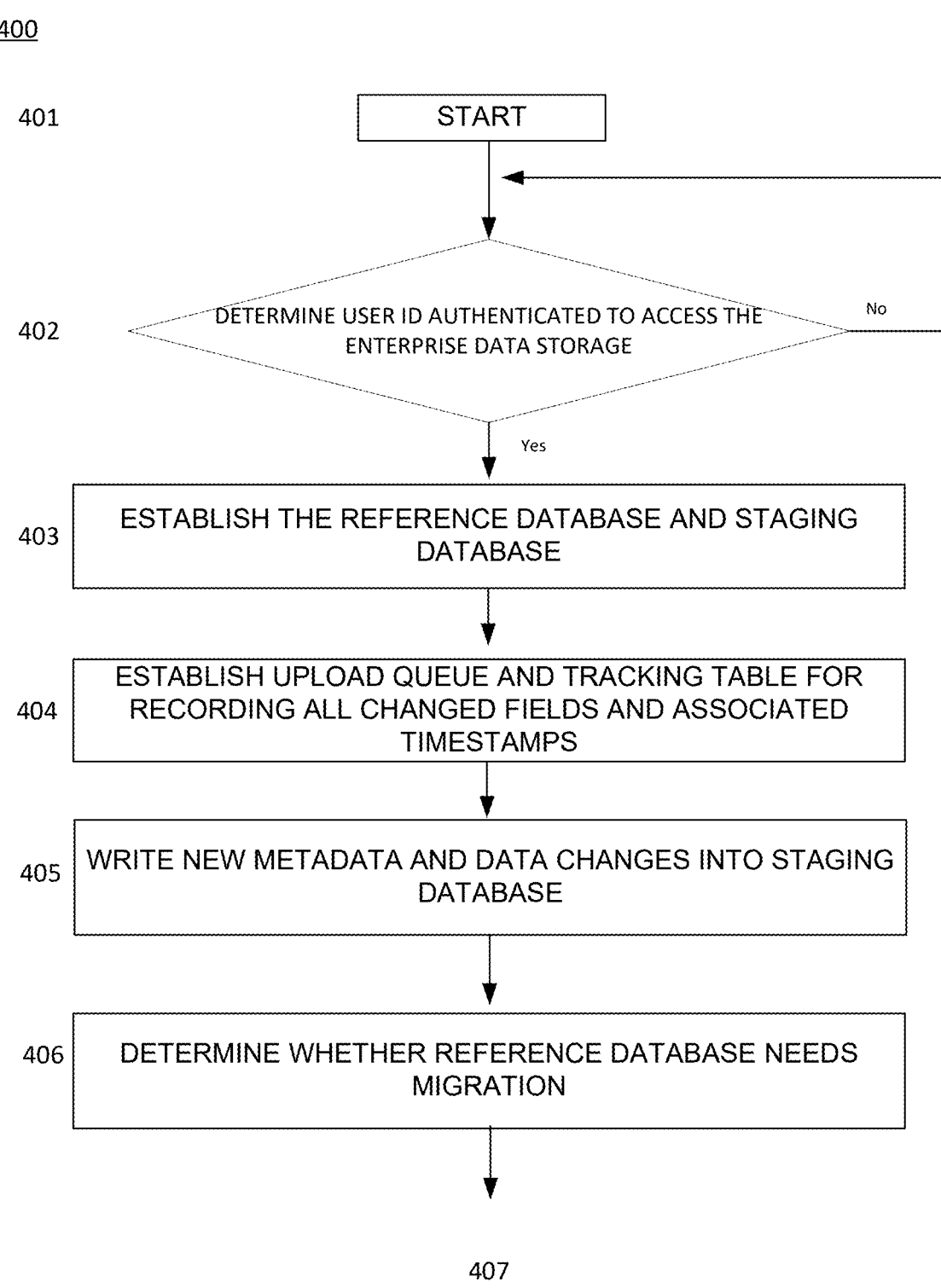

400

401   START

402   DETERMINE USER ID AUTHENTICATED TO ACCESS THE ENTERPRISE DATA STORAGE          No

Yes

403   ESTABLISH THE REFERENCE DATABASE AND STAGING DATABASE

404   ESTABLISH UPLOAD QUEUE AND TRACKING TABLE FOR RECORDING ALL CHANGED FIELDS AND ASSOCIATED TIMESTAMPS

405   WRITE NEW METADATA AND DATA CHANGES INTO STAGING DATABASE

406   DETERMINE WHETHER REFERENCE DATABASE NEEDS MIGRATION

Figure 4B:
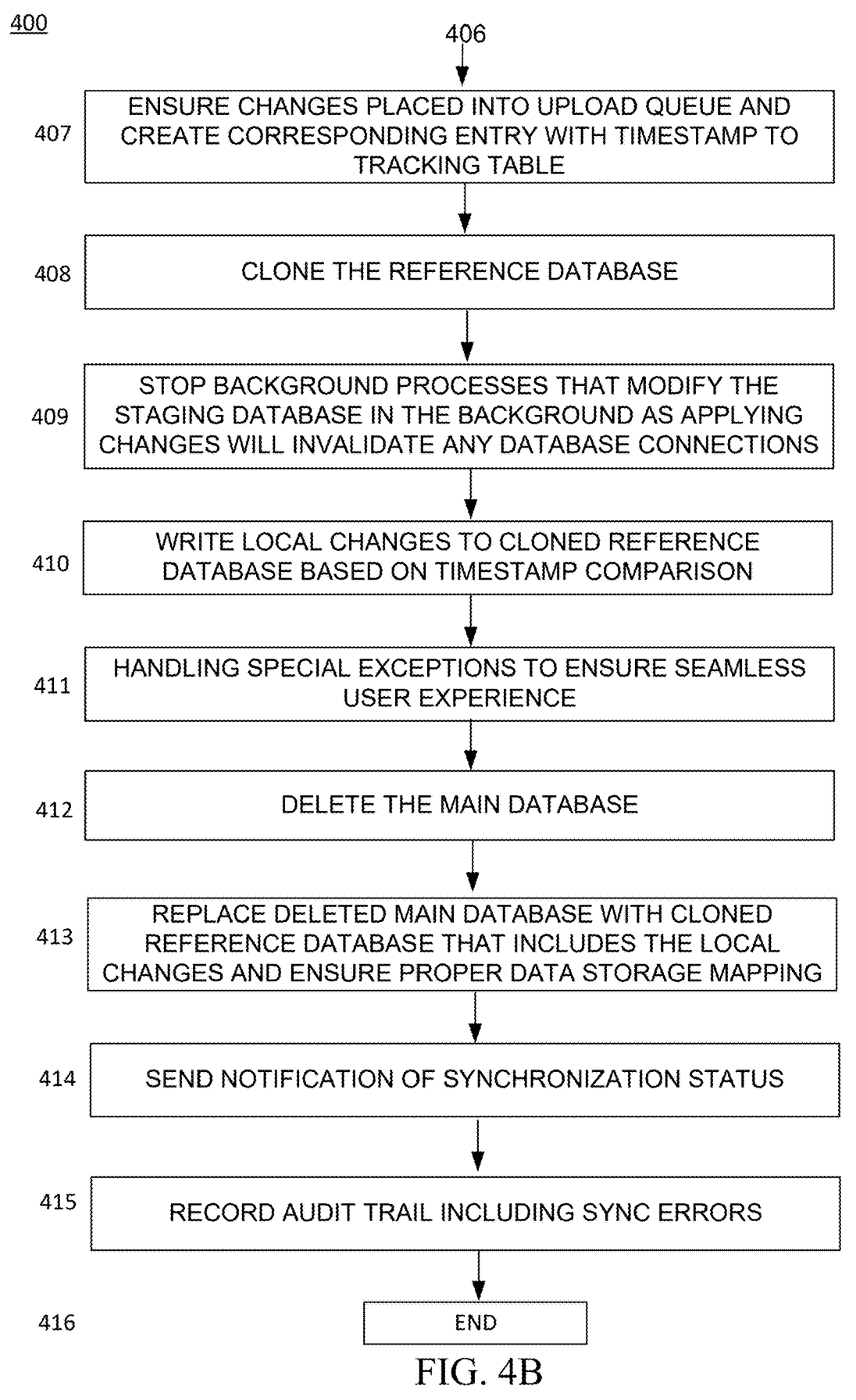

| 407 | ENSURE CHANGES PLACED INTO UPLOAD QUEUE AND CREATE CORRESPONDING ENTRY WITH TIMESTAMP TO TRACKING TABLE |

| 408 | CLONE THE REFERENCE DATABASE |

| 409 | STOP BACKGROUND PROCESSES THAT MODIFY THE STAGING DATABASE IN THE BACKGROUND AS APPLYING CHANGES WILL INVALIDATE ANY DATABASE CONNECTIONS |

| 410 | WRITE LOCAL CHANGES TO CLONED REFERENCE DATABASE BASED ON TIMESTAMP COMPARISON |

| 411 | HANDLING SPECIAL EXCEPTIONS TO ENSURE SEAMLESS USER EXPERIENCE |

| 412 | DELETE THE MAIN DATABASE |

| 413 | REPLACE DELETED MAIN DATABASE WITH CLONED REFERENCE DATABASE THAT INCLUDES THE LOCAL CHANGES AND ENSURE PROPER DATA STORAGE MAPPING |

| 414 | SEND NOTIFICATION OF SYNCHRONIZATION STATUS |

| 415 | RECORD AUDIT TRAIL INCLUDING SYNC ERRORS |

| 416 | END |

SYSTEMS AND METHODS FOR NON-BLOCKING SYNCHRONIZATION OF SECURE CUSTOMER DATA

CROSS-REFERENCE TO RELATED APPLICATIONS

The present application is a continuation of U.S. patent application Ser. No. 18/532,518 entitled "Systems and Methods for Non-Blocking Synchronization of Secure Customer Data", filed Dec. 7, 2023, which is incorporated herein in its entirety.

TECHNICAL FIELD

The present disclosure relates generally to systems and methods that provide for non-blocking synchronization of secure customer data.

BACKGROUND

Utilizing local data storage in enterprise data management typically helps increase efficiency by allowing fewer data queries, fewer network accesses and faster processing times. A subset of the enterprise data storage can be extracted and used on the local data storage locally while using the application. However, the local data storage needs to be synchronized with the enterprise data storage periodically to ensure accurate data management. Users are required perform a manual blocking sync in order to receive the latest changes. The current synchronization process is a modal synchronization that prohibits the access to the application while the synchronization is in progress. Users are required to wait until the sync finishes and cannot use the app while the sync is occurring. Depending on the last performed synchronization, there could be a very long delay. This inconvenience to the user disrupts user experience. There is a need for a system that provides non-blocking synchronization of secure customer data that overcomes the above problems, as well as one that provides additional benefits.

SUMMARY OF THE INVENTION

Embodiments disclosed in the present document provide machine-implemented method for non-blocking synchronization of secure customer data of an enterprise data storage. The method comprises: authenticating a user ID for access to the enterprise data storage for use with a client application; establishing a first local data storage that can be used offline that includes a subset of secure customer data from the enterprise data storage, wherein the first local data storage remains in a clean state devoid of local changes; establishing a second local data storage that includes the subset of secure customer data from the enterprise data storage; modifying a data object record in the second local data storage and creating an associated entry in a tracking table, wherein entries in the tracking table maintain data object record upserts, updates, and deletions in the second local data storage; cloning the first local data storage to create a third local data storage; executing each entry in the tracking table to modify the third local data storage such that the third local data storage includes local changes; deleting the first local data storage; and creating a mapping model to replace the deleted first local data storage with the modified third local data storage including local changes to perform non-blocking synchronization of the third local data storage, wherein the non-blocking synchronization of the third local data storage allows access to the client application.

BRIEF DESCRIPTION OF THE DRAWINGS

For a more complete understanding of the present application and its advantages, references are now made to the following description taken in conjunction with the accompanying drawings, in which like reference numbers indicate like features.

FIG. 1 illustrates an exemplary enterprise data management architecture for non-blocking synchronization of secure customer data wherein the present invention may be implemented.

FIGS. 4A and 4B illustrate exemplary flowcharts of a method for non-blocking synchronization of secure customer data in the enterprise data management architecture shown in FIG. 1 according to one embodiment of the present invention.

Although similar reference numbers may be used to refer to similar elements for convenience, it can be appreciated that each of the various example embodiments may be considered to be distinct variations.

The present embodiments will now be described hereinafter with reference to the accompany drawings, which form a part thereof, and which illustrate example embodiments which may be practiced. As used in the disclosures and the appending claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on,"

DETAILED DESCRIPTION OF INVENTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 5:
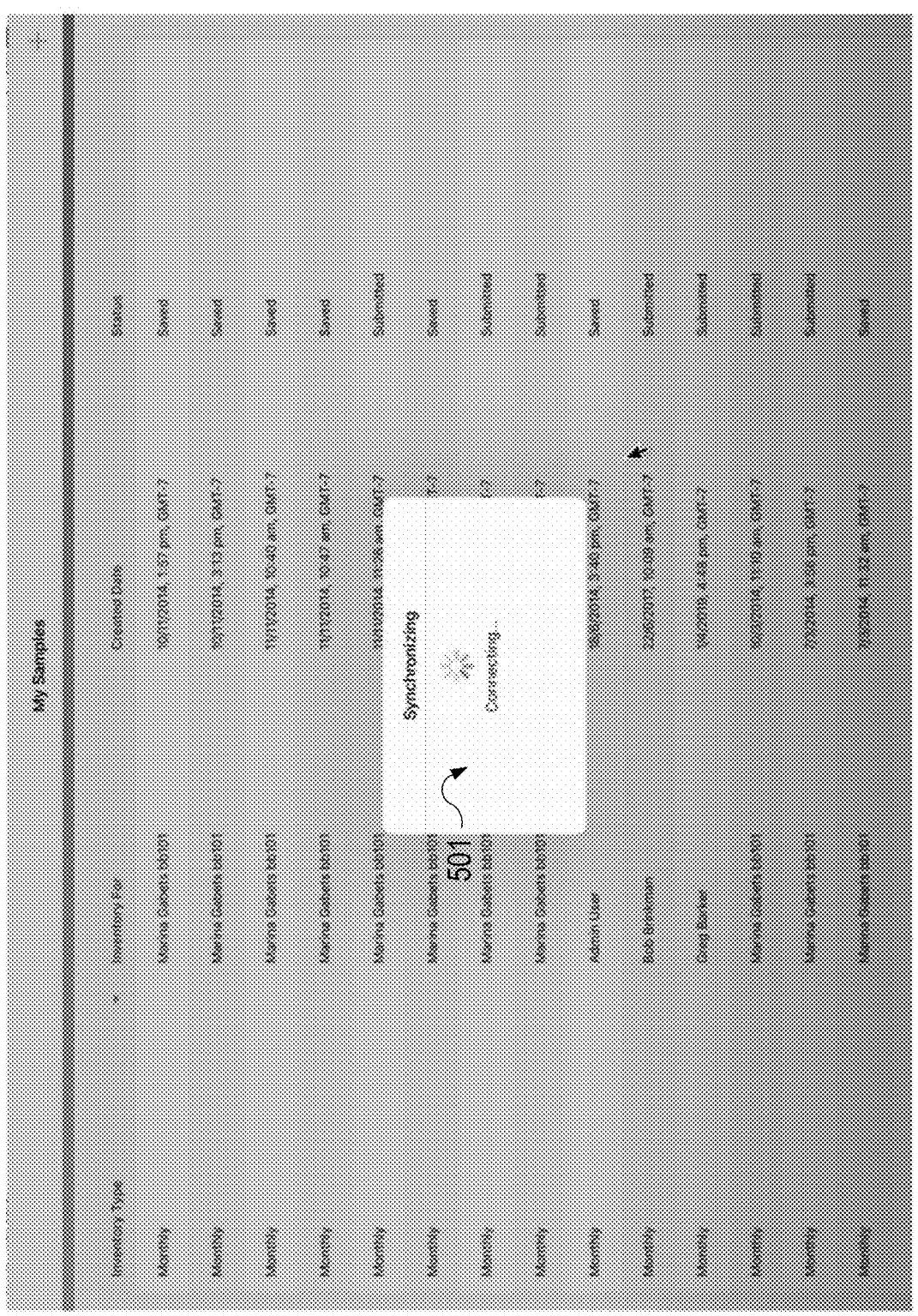
FIG. 5 illustrates an exemplary user interface modal synchronization of secure customer data according to one embodiment of the present invention.

Referring now to FIG. 5, an exemplary user interface is shown depicting the current modal synchronization process that prohibits the access to the application while the synchronization is in progress. A modal 501 shows the current status of the synchronization process. However, while the synchronization is being executed, the application is not accessible in the background. This inconvenience limits the user's productivity. Embodiments disclosed in the present invention allow for non-blocking synchronization of secure customer data for an enterprise data management architecture.

FIG. 1 is a system overview illustrating an embodiment of a non-blocking synchronization of secure customer data system 100. The presently disclosed embodiment comprises a controlled content repository 102, a Customer Relationship Management (CRM) 108, and a multichannel processing engine 110. The CRM 108 comprises a customer relationship management subsystem 104 and a customer relationship management server 106. The customer relationship management server 106 may provide access to a customer relationship management subsystem 104, and the multichannel processing engine 110. In one embodiment, the customer relationship management subsystem 104 may be operated by a third party.

The multichannel processing engine 110 may be accessed by users such as company sales representatives through web clients or through mobile apps (such as iOS, Android, Blackberry, or Windows Mobile systems), communicating with the multichannel processing engine 108 through web servers. Although the users may be described in the present application as being company sales representatives, this particular described embodiment is not intended to limit the generality of the claims that may eventually issue in patents stemming from the present disclosure.

The controlled content repository 102 is designed to have a process for developing approved content that is sharable across multiple users, such as shareholders, reviewers, managers, marketing personnel, sales representatives, etc. The content generated in the controlled content repository 102 may be accessed on a regulated basis and used to generate approved electronic communications. This regulated basis may be determined, in part, by the company as a whole and additionally by interaction with data from the customer relationship management subsystem 104, described in further detail below. In one embodiment, approved content, customer profile information, customer preferences, and regulatory limitations and requirements may be stored in a table in the controlled content repository 102. In addition to storage and development of content, the controlled content repository 102 may also store an audit trail 150, tracking exact content of communications as they were sent by the user (e.g. pharmaceutical representative), as well as metadata about the communications and information regarding the content accessed by recipients (e.g. HCP).

In one implementation, the controlled content repository 102 may be a multi-tenant system where various elements of hardware and software may be shared by one or more customers. For instance, a server may simultaneously process requests from a plurality of customers. In a multi-tenant system, a user is typically associated with a particular customer. For instance, a user could be an employee of one of a number of pharmaceutical companies which are tenants, or customers. In one embodiment, the controlled content repository may run on a cloud computing platform.

The customer relationship management subsystem 104 contains all professional information of health care providers (HCPs) that may be available to users, including contact information, licensing information, areas of practice, and specialties. In addition, the customer relationship management subsystem may also be capable of storing configurations regarding specific preferences, regulatory limitations and requirements, and other fields that will facilitate the generation of appropriate approved electronic communications, in general or on a by recipient basis. These preferences and/or requirements include both the preferences of the user (e.g., maintaining account lists) as well as the preferences of the enterprise (e.g., employers of the users). In other examples, the customer relationship management subsystem may have a content management subsystem and may provide approved content and templates of approved communications.

In this embodiment, the customer relationship management subsystem 104 is capable of communication with multiple sources through the customer relationship management server 106 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem 104 pulls the approved version of what represents an account or physician, which then pulls from multiple networks to ensure that the information regarding an account is up-to-date. The customer relationship management subsystem 104 may also be used to determine the type of domain an email communication is delivered through. A recipient in Spain may receive an email from "Companyx.es, whereas a recipient in Germany would receive the same email from "Companyx.ge." This may allow for additional branding options for the company controlling and sending the electronic communications.

With further reference to the customer relationship management subsystem 104, this system may be a cloud-based customer database that provides a central access to store and distribute consistent data across customer companies as well as their possible third-party partners and agencies that are used to keep this data updated. This system can provide standard data formats and provide an easy and automated way for customers (e.g. pharmaceutical companies) and/or users (e.g. pharmaceutical reps) to have access to coordinated and frequently updated CRM data and to use that coordinated data for sending approved electronic communications in accordance with the system described herein. In an embodiment, the multichannel processing engine 110 is responsible for combining the customer account information from the customer relationship management subsystem with content available from a controlled content repository. Within the customer relationship management subsystem 104, customer accounts may be assigned a set of alignment rules which determine specific pieces of content that are available for use from the controlled content repository 102. The multichannel processing engine 110 may apply these rules and supply the user with a list of approved communication templates and pieces of content that may then be used to construct a tailored approved communication.

Communication between the multichannel processing engine 110 and the customer relationship management subsystem 104 may occur via the customer relationship management server 106, which acts as an interface between the two. The customer relationship management server 106 may act solely as an entry and exit point for the customer relationship management subsystem 104. The user may access the multi-channel processing engine 110 through either a Web Client or through the mobile apps (such as iOS, Android, Blackberry, or Windows Mobile systems).

Figure 2:
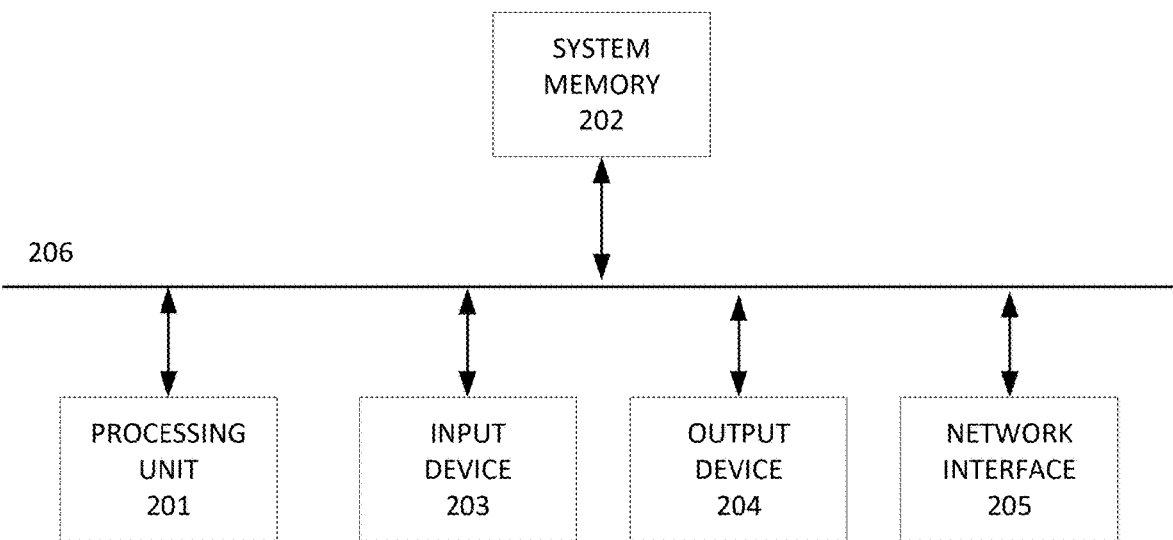
FIG. 2 illustrates an exemplary block diagram of a computing device according to one embodiment of the present invention.

FIG. 2 illustrates an exemplary block diagram of a computing device 200 which can be used as the user computing devices 120a-120n in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205, and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various applications programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
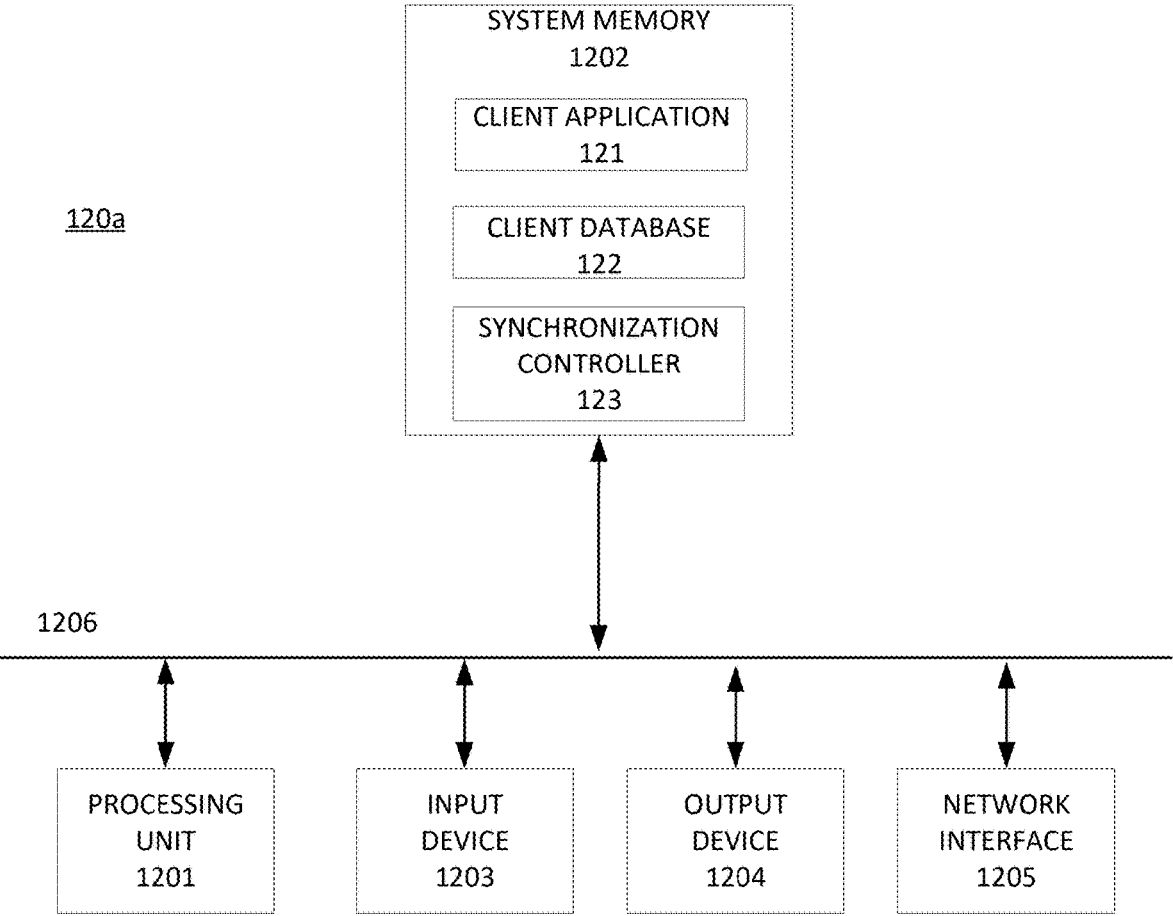
FIG. 3 illustrates an exemplary high level block diagram of a user computing device wherein the present invention may be implemented.

FIG. 3 illustrates an exemplary high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206. The client application 121 and the client database 122 may be stored in the system memory 1202. In one embodiment, the client database 122 may be maintained in a local store, e.g., a hard disk, relational store, cache memory, etc. The system memory 1202 may also store a synchronization controller 123, which may facilitate the non-blocking synchronization of secure customer data between the client database 122, the customer relationship management subsystem 104, and the controlled content repository 102. The synchronization controller 123 may serve as an interface between the various data sources including the client database 122, the customer relationship management subsystem 104 and the controlled content repository 102.

In one embodiment, the client application 121 is a sales tool for helping users (e.g., sales representatives) of customers (e.g., pharmaceutical companies) to promote products to health care professionals (HCPs). Each of the customers (e.g., pharmaceutical companies) may store physician professional information it collected and/or purchased in the CRM subsystem 104 which may be a multi-tenant, cloud based CRM database system. Each customer (e.g., pharmaceutical company) may manage data availability to its users (e.g., pharmaceutical representatives) by territories, which could be a geographic area, or a product. Each user may access data in the CRM subsystem 104 of one of the customers, specifically data for physicians in the territory he/she is assigned. A customer may store information of tens of thousands of physicians and hundreds of products in the CRM subsystem 104, but a user (e.g., pharmaceutical representative) may be allowed access to information of only a subset of the physicians (e.g., hundreds) and/or a subset of the products (e.g., tens) which are in the territory he/she is assigned.

To enable a user (e.g., pharmaceutical representative) to use the client application 121 even when the user computing devices 120a-120n are disconnected and provide seamless transition between online and offline use, data relevant to a user's (e.g., pharmaceutical representative) use of the client application 121 may be stored in the client database 122. Such information may include, e.g., data related to the subset of physicians and/or products in his/her territory. The user (e.g., sales representative) may further be allowed to access the closed loop marketing ("CLM") content for the subset of products in his/her territory. The user (e.g., pharmaceutical representative) may further be allowed to access analytics data about the subset of physicians and/or products in his/her territory. The CLM content for the subset of products and analytics data about the subset of physicians and/or products may be stored in the client database 122 as well. The client application 121 may be used by the users (e.g., pharmaceutical representatives) to, e.g., search for a physician, schedule a meeting with the physician, search for and display CLM content during the meeting with the physician, record the call, and update physician and/or product information.

In order to provide a user (e.g., pharmaceutical representative) correct and newest information, and to share new information from a user with other users for the same customer (e.g., pharmaceutical company), client databases 122 on user computing devices 120a-120n and the enterprise data storage (e.g., CRM subsystem 104) need to be synchronized from time to time. The client database 122 and the enterprise data storage may be synchronized regularly according to a present schedule, in response to a user request, and/or when the user computing device 120a-120n is back online.

FIGS. 4A and 4B illustrate an exemplary flowchart of a method for non-blocking synchronization of secure customer data in the enterprise data management architecture 100 (as shown in FIG. 1) from a client application according to one embodiment of the present invention. Referring now to FIG. 4A, the process may start at 401.

At 402, determination is made whether the user ID is authenticated to access the enterprise data storage. In one implementation, the data storage may be the CRM subsystem 104. The user (e.g., pharmaceutical representative) may log into the client application 121, and be authenticated to access the CRM subsystem 104.

At 403, after the user ID is authenticated to access the enterprise data storage, the synchronization controller 123 establishes a reference database and staging database in the system memory 1202. The reference database may store a subset of the enterprise data storage (e.g., CRM subsystem 104) that client applications (e.g., 121) in user computing devices 120a-120n may use. In one embodiment, the reference database may store data that pharmaceutical companies may need when promoting new products, which may include physician professional information (e.g., name, specialty, license information, affiliated health care organization ("HCO"), contact information at the affiliated HCO, prior interaction record, electronic signature for samples, and medical inquiry submission), product information (e.g., name, category, lot and statistics), pharmaceutical representative information (e.g., name, territory information, sharing rules and sales reports). It should be understood that the reference database may store data for other industries as well. In another embodiment, the reference database may store CRM data for managing opportunities and tracking employee success rates.

In one implementation, the staging database may contain an initial copy of the reference database. New changes (updates, additions, deletions, etc.) may be performed on the staging database as will be described in further detail below.

At 404, the synchronization controller 123 establishes an upload queue and a tracking table for recording all changed data fields and their associated timestamps. Maintaining a tracking table stores information about what data object records have been modified. In one implementation, the tracking table includes entries for every change (e.g., creation, deletion, modification, etc.), timestamps, relevant UUIDs, relevant changed data fields, and indication whether the record was deleted as part of the operation. For example, for an auto sync download the system modified timestamp or the last modified date for the data object record will be stored. For auto sync uploads, a constant distant future timestamp is used when placed into the upload queue and updated with the server timestamp on successful upload. Storing the information in the tracking table eliminates the need for extra queries and accessing the database to query the timestamps. Storing relevant universal unique identifiers (UUIDs) may be needed for uploads, specifically the UUID needs to match the UUID of the upload transaction in the tracking table so the timestamp can be updated after the upload is completed. Storing relevant changed fields are useful when copying local changes because standard updates on offline clients only update/upload data fields that the user has explicitly changed. Indication of whether the data object record was deleted may be useful for special handling, as will be described in further detail below.

At 405, the synchronization controller 123 writes the new metadata and data object field changes on the staging database. In one implementation, the reference database will still contain the subset of the enterprise data storage after the most recent refresh or synchronization. The reference database is clean and does not contain any user or local changes.

The reference database is kept in a state that is what the offline client application 121 should have.

Figure 6:
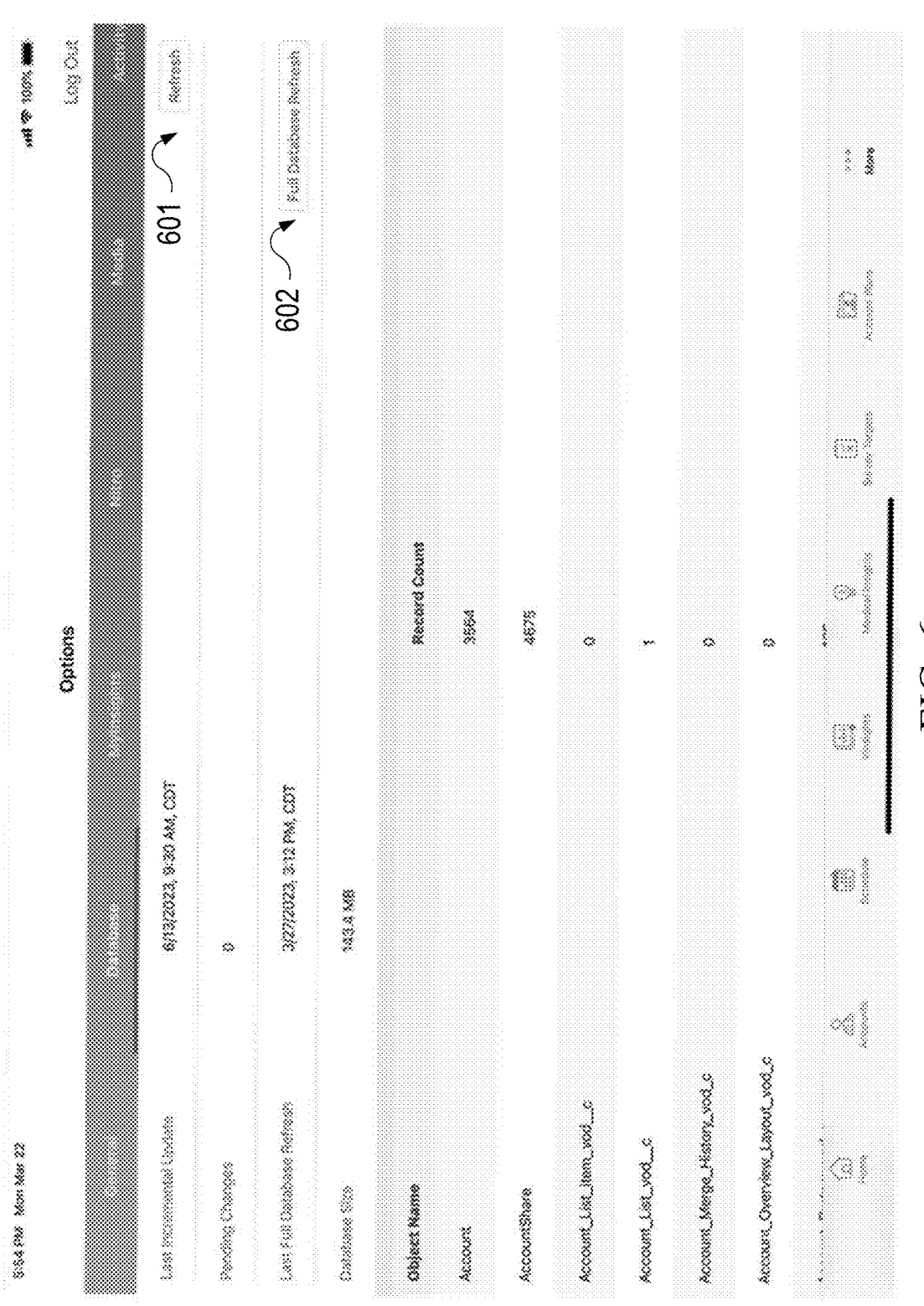
FIG. 6 illustrates an exemplary user interface for non-blocking synchronization of secure customer data according to one embodiment of the present invention.

At 406, when the new metadata and data object field changes are finished downloading into the staging database, the synchronization controller 123 may determine whether the reference database needs migration. Referring now to FIG. 6, an exemplary user interface for initiating non-blocking synchronization of secure customer data is shown. Either the "Refresh" button 601, or the "Full Database Refresh" button 602 requires the migration of the reference database. In another implementation, a synchronization may be regularly initiated according to a present schedule, and/or when the user computing device 120a-120n is back online. When the refresh or synchronization is identified, the synchronization controller 123 may continue to step 407. Otherwise, the synchronization controller will continue to write the new metadata and data object field changes on the staging database in 405.

Figure 7:
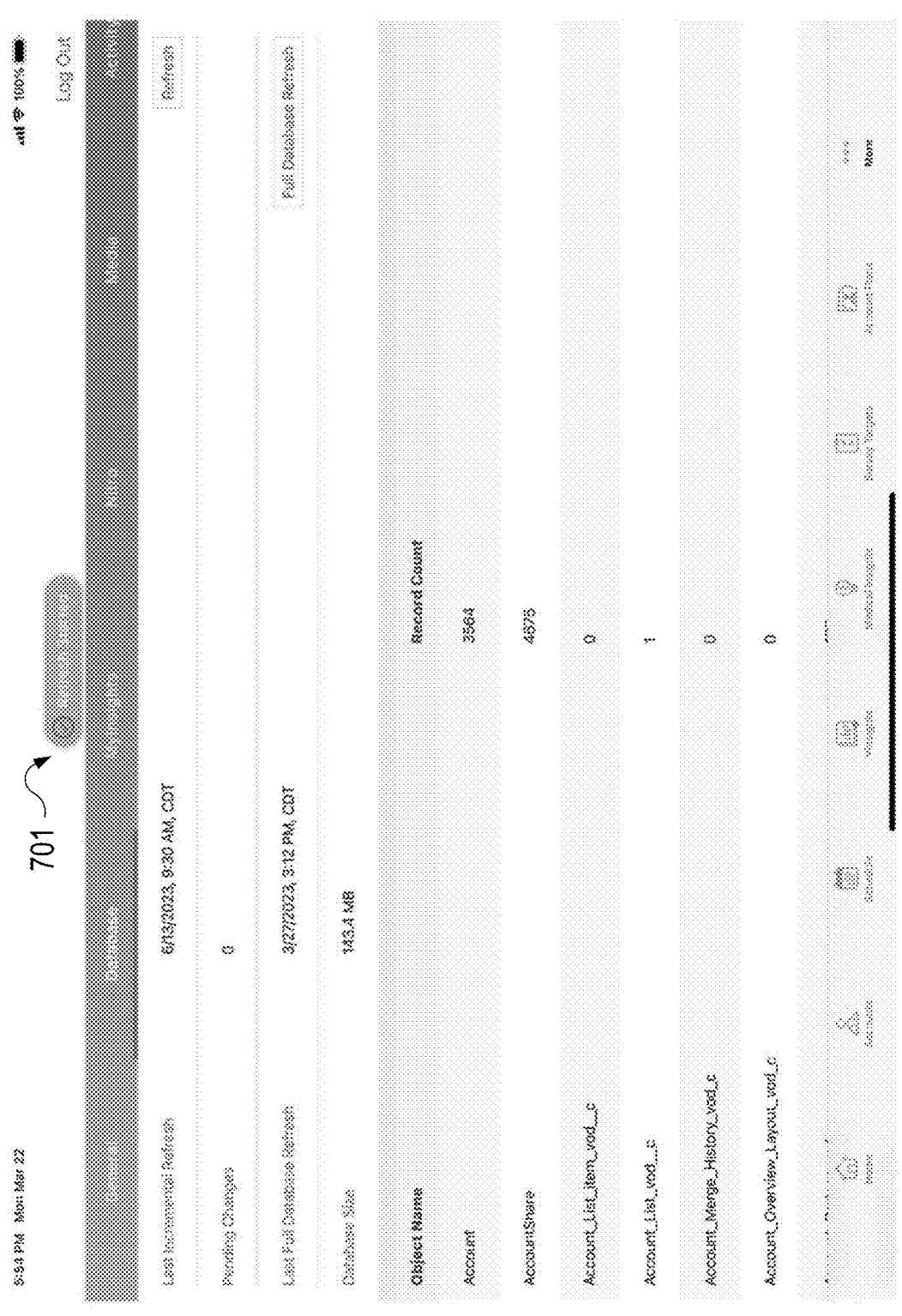
FIG. 7 illustrates another exemplary user interface for non-blocking synchronization of secure customer data according to one embodiment of the present invention.

Referring now to FIG. 7, another exemplary user interface 700 is shown for initiating non-blocking synchronization of secure customer data that depicts the status of the non-blocking synchronization process 701. As shown, the client application 121 is still accessible while the non-blocking synchronization is in process. In another implementation, the "Update could not be applied" message may be displayed to indicate a synchronization error.

Referring now to FIG. 4B, at 407, actions are needed to ensure the client application 121 is in a good state when applying changes. In one implementation, the synchronization controller 123 ensures changes are placed in the upload queue and corresponding entries are created in the tracking table. Other actions may include existing cleanup for upload, auto sync, geocoder, and account address mapping.

At 408, the synchronization controller clones the reference database. In one implementation, the synchronization controller 123 copies both the metadata and the data objects of the reference database to generate a cloned reference database which will contain the local changes as will be described in further detail below.

At 409, background processes that may invalidate the database connections are preemptively stopped. In one implementation, the synchronization controller 123 stops the background processes that modify the staging database in the background. For example, some upload processes may create duplicate calls. Similarly, auto sync merging, geocoder, and account address mapping may modify the staging database in the background.

At 410, local changes are applied and written to the cloned reference database based on compared timestamps stored in the tracking table. In one implementation, the timestamp may be the timestamp when the data object record was last modified or acknowledged online and is a server based timestamp. If a record is saved or merged by auto sync, the record id, mobile id, and object type are stored along with the data object record timestamp in the tracking table. If the record exists in the cloned reference database and the timestamp for the record id in the cloned reference database is older, the record corresponds to a local change. In this case, the staging database record kept. However, if the timestamp for the record id in the cloned reference database is newer, the record is up to date in the cloned reference database. In this case, the staging database record can be removed. If the record ID does not exist in the cloned reference database and there is a pending upload in the upload queue, then the record corresponds to a local change and the staging database record kept. If the record ID does not exist in the cloned reference database and there is not a pending upload in the upload queue, then the record should not exist offline and the staging record can be removed. In one implementation, timestamps of entries in the tracking table are compared to the timestamps for the record ids in the cloned reference database. When the timestamps for the record id in the tracking table are newer than the timestamps for the record id in the cloned reference database, this corresponds to a local change and the local change is written to the cloned reference database.

At 411, certain special exceptions need to be handled to ensure a seamless user experience. In one implementation, some user options are not captured as local changes that would be saved in the cloned reference database, but need to be carried over to ensure a positive user experience. One example may be filters on the secure customer data. As will be described in more detail further below, the staging database will be swapped and if these user configurations or options are not propagated, the user experience will be disturbed. Another example is when new users are created, these are not captured by the tracking table, but need to be. In another implementation, some options need to be excluded from the cloned reference database. One example may be the timestamp since these timestamps will be modified by the synchronization process as detailed above.

At 412, the synchronization controller 123 deletes the main database. In one implementation, the local changes from the main database were transferred to the cloned reference database in 410 above.

At 413, the synchronization controller 123 replaces the deleted main database with the cloned reference database that includes the local changes. In one implementation, the synchronization controller 123 ensures the proper data storage mapping. When there are any issues during the database migration (e.g., cannot create mapping model, or cannot write metadata/data from the staging database to the cloned reference database due to a corrupt database), the reference database is deleted and a full refresh is performed.

Figure 8:
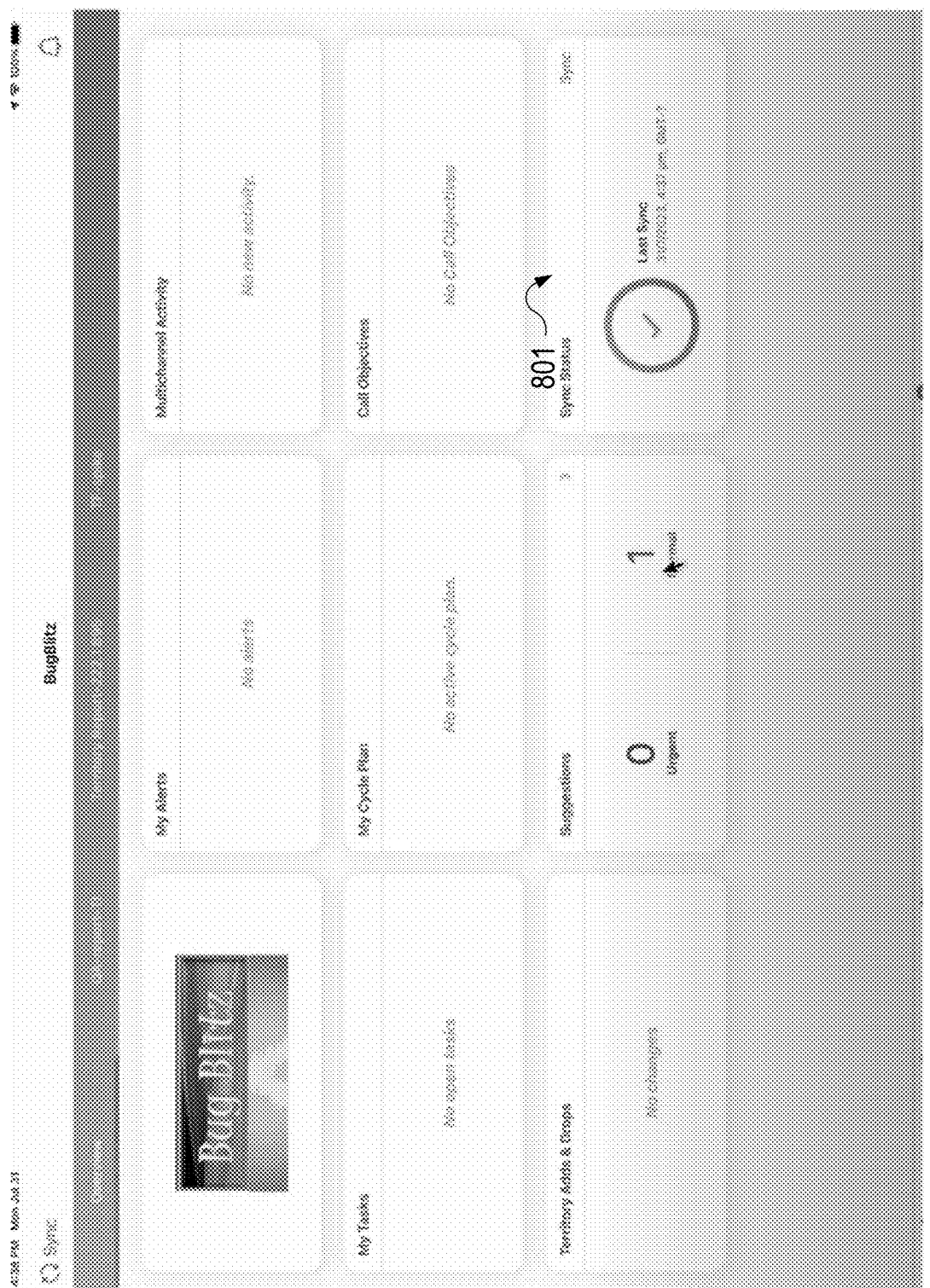
FIG. 8 illustrates another exemplary user interface for non-blocking synchronization of secure customer data according to one embodiment of the present invention.

At 414, the synchronization controller 123 sends notification of the status of the synchronization. Referring to the FIG. 8, a synchronization status is displayed at 801. As depicted, the color indicator as well as the last sync date and time are provided. In another implementation, a "downloading update" status may be displayed to indicate the reference database is being established in 403. In one implementation, if there is a synchronization error, the user may be prompted with a modal indicating the failed refresh and the option to cancel the refresh. The synchronization controller 123 then deletes the staging database and makes a copy of the reference database to use as the staging database.

At 415, the synchronization controller 123 records the audit trail to include any synchronization errors. The process ends at 416.

Figure 9A:
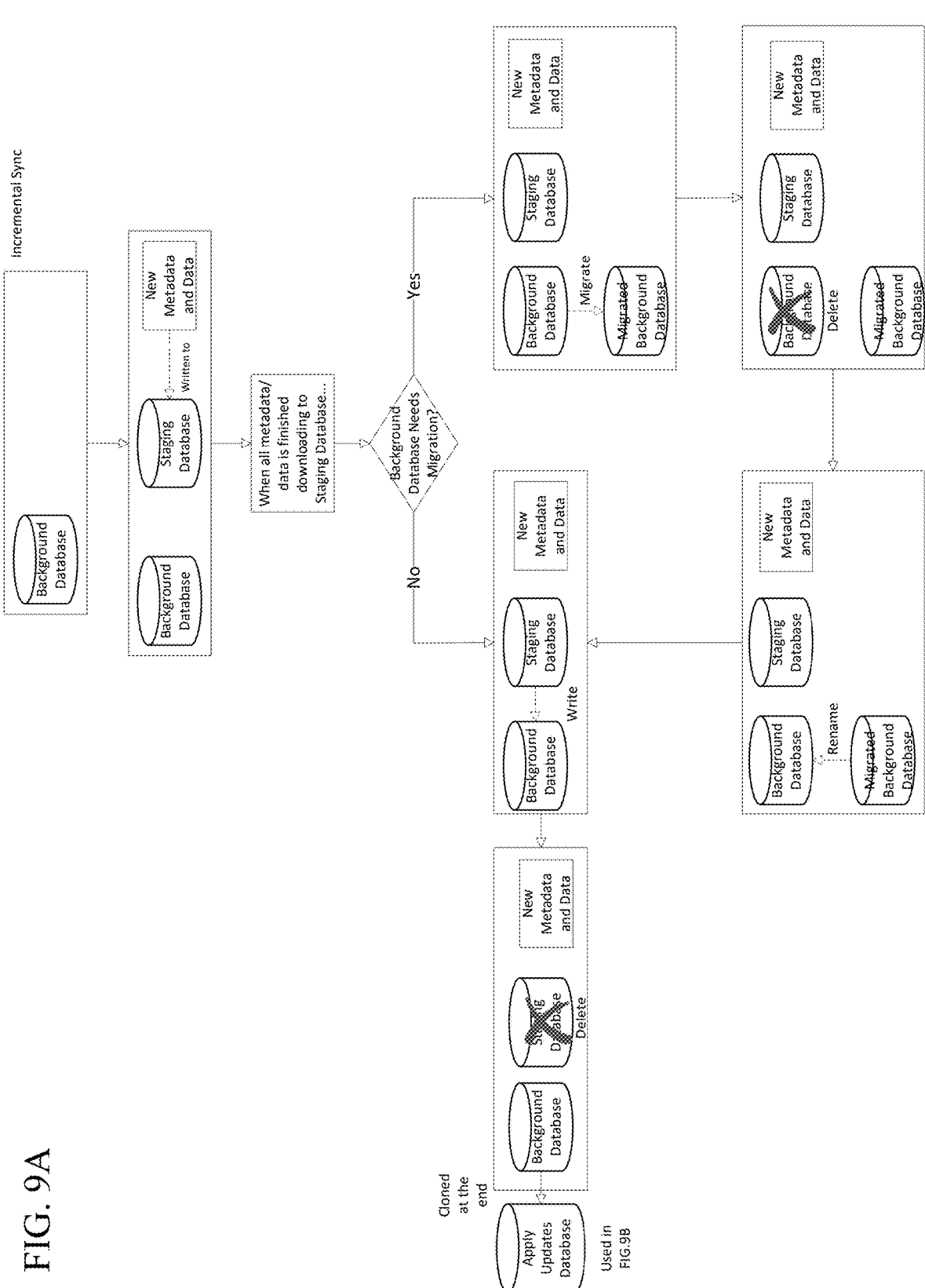
FIGS. 9A and 9B illustrate another exemplary flow of a method for non-blocking synchronization of secure customer data in the enterprise data management architecture shown in FIG. 1 according to one embodiment of the present invention.
Figure 9B:
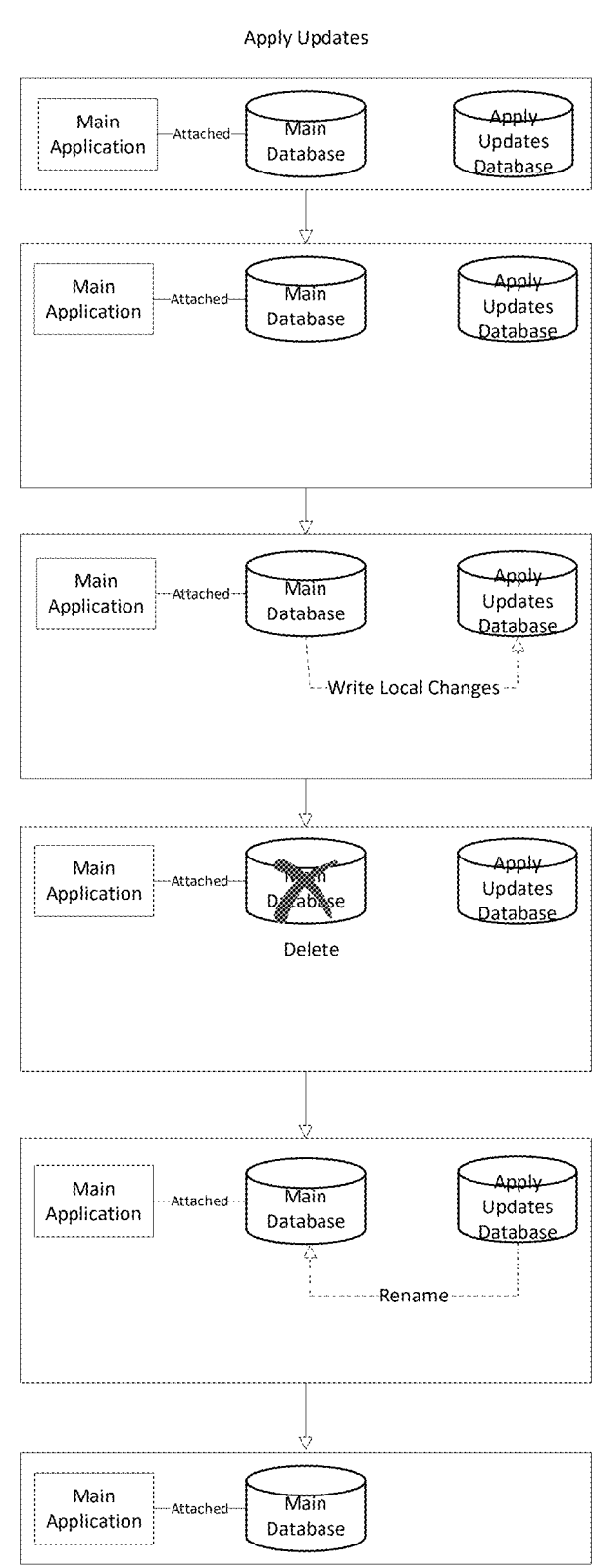

Referring to FIGS. 9A and 9B, another exemplary flow of a method for non-blocking synchronization of secure customer data in the enterprise data management architecture according to one embodiment of the present invention is illustrated.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

The approved content may be in any format, e.g., text, audio, video, picture, multimedia, or PDF.

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time." "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

The steps and/or operations described above in relation to an embodiment of the present disclosure may occur in a different order, or in parallel, or concurrently for different epochs, etc. depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially firmware and/or hardware, including, but not limited to one or more application-specific integrated circuits ("ASICS"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple micro controllers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention' in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for non-blocking synchronization of secure customer data of an enterprise data storage, comprising:

authenticating a user ID for access to the enterprise data storage for use with a client application;

establishing a first local data storage that that includes updates prior to most recent synchronization execution;

establishing a second local data storage that includes the subset of secure customer data from the enterprise data storage;

creating a tracking table, wherein entries in the tracking table maintain data object record upserts, updates, and deletions in the second local data storage;

executing each entry in the tracking table to modify the first local data storage such that the first local data storage includes local changes;

deleting the second local data storage; and creating a mapping model to replace the deleted second local data storage with the modified first local data storage including local changes to perform non-blocking synchronization of the first local data storage.

2. The computer-implemented method of claim 1 above, wherein the enterprise data storage is a centralized customer relationship management ("CRM") database.

3. The computer-implemented method of claim 1 above, wherein the entries in the tracking table store details including at least one of: timestamp, universal unique identifiers, relevant changed data fields, and indication whether the record was deleted as part of the operation.

4. The computer-implemented method of claim 1 above, wherein the executing of each entry in the tracking table to modify the third local data storage such that the third local data storage includes user and local changes is based on timestamps.

5. The computer-implemented method of claim 4 above, wherein the timestamp associated with the entry in the tracking table is compared to the data object record last modified timestamp in the third local data storage.

6. The computer-implemented method of claim 5 above, wherein when the timestamp for the data object record in the third local data storage is older than the timestamp associated with the entry in the tracking table, the data object record modification is a local change.

7. The computer-implemented method of claim 1 above, wherein the non-blocking synchronization of secure customer data is performed regularly according to a present schedule, in response to a user request, or when the first local data storage is back online.

8. The computer-implemented method of claim 1 above, further comprising:

displaying a non-blocking synchronization status notification indicating the state of the synchronization process.

9. The computer-implemented method of claim 1 above, further comprising:

performing actions on the client application while the synchronization process is executing.

10. The computer-implemented method of claim 1 above, further comprising:

while the synchronization process is executing, navigating to an account page to log a call report with a health care professional.

11. The computer-implemented method of claim 1 above, further comprising: stopping background processes that modify the second local data storage during the synchronization process that invalidates database connections.

12. The computer-implemented method of claim 11 above, wherein the background processes is selected from one of the following: auto sync merging, geocoder, and account address mapping.

13. The computer-implemented method of claim 1 above, further comprising: when there is a synchronization error, deleting the first local data storage and performing a full refresh.

14. The computer-implemented method of claim 1 above, further comprising:

creating an upload queue that maintains a sequence of data object records in an order to be uploaded; and adding a first data object record to be uploaded to the upload queue.

15. The computer-implemented method of claim 13 above, further comprising: creating an associated entry in the tracking table for each entry in the upload queue.

16. The computer-implemented method of claim 14 above, wherein the associated entry in the tracking table includes a timestamp for the data object record to be uploaded.

17. The computer-implemented method of claim 15 above, further comprising: wherein the associated entry in the tracking table includes a universal unique identifier for the data object record to be uploaded.

18. The computer-implemented method of claim 16 above, further comprising:

uploading the first data object record;

identifying the associated entry in the tracking table using the universal unique identifier; and updating the timestamp for the associated entry in the tracking table to the time the first data object record upload was executed.

19. The computer-implemented method of claim 1 above, further comprising:

storing an audit trail recording synchronization failures.

20. The computer-implemented method of claim 1 above, wherein, the enterprise data storage comprises data from a third-party data provider.

\* \* \* \* \*